Jan. 9, 1934.     E. E. DRAPER     1,942,638
PROCESS OF MAKING STEREOSCOPIC PICTURES BY INSTANTANEOUS EXPOSURE
Filed April 24, 1931     4 Sheets-Sheet 1
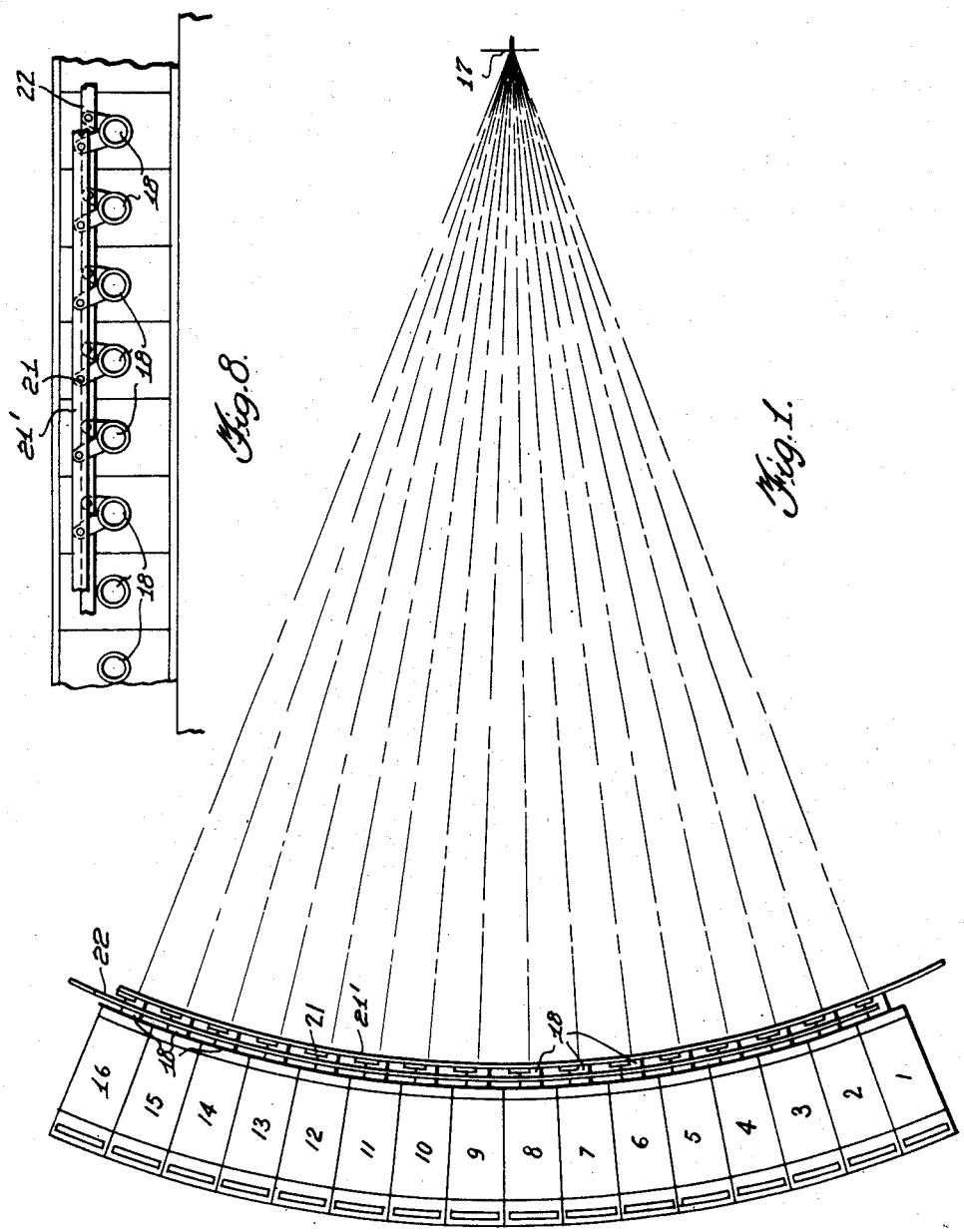
INVENTOR.
Ernest E. Draper
BY
Harvey Lea Dodson
ATTORNEY.

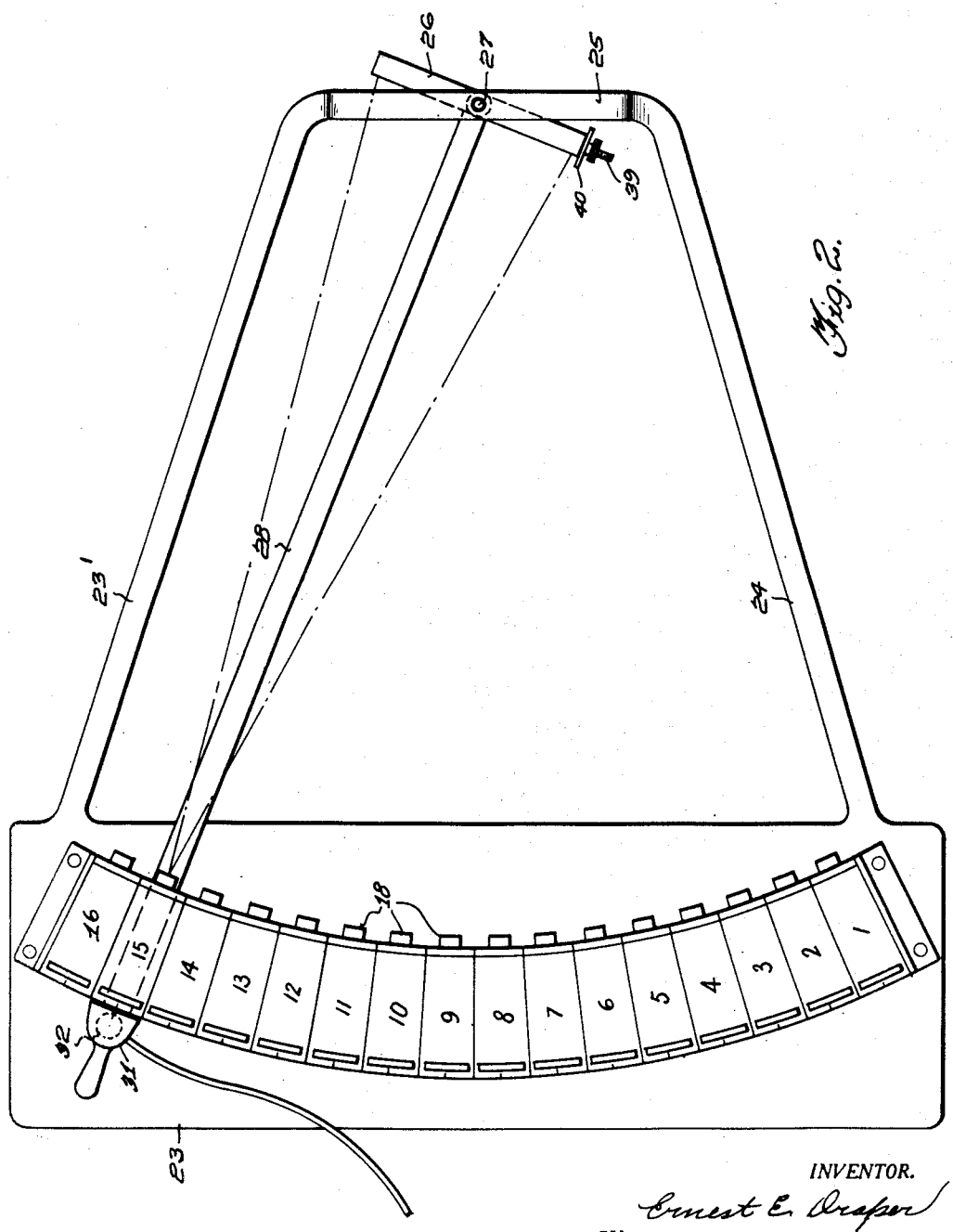

Jan. 9, 1934. E. E. DRAPER 1,942,638
PROCESS OF MAKING STEREOSCOPIC PICTURES BY INSTANTANEOUS EXPOSURE
Filed April 24, 1931 4 Sheets-Sheet 3
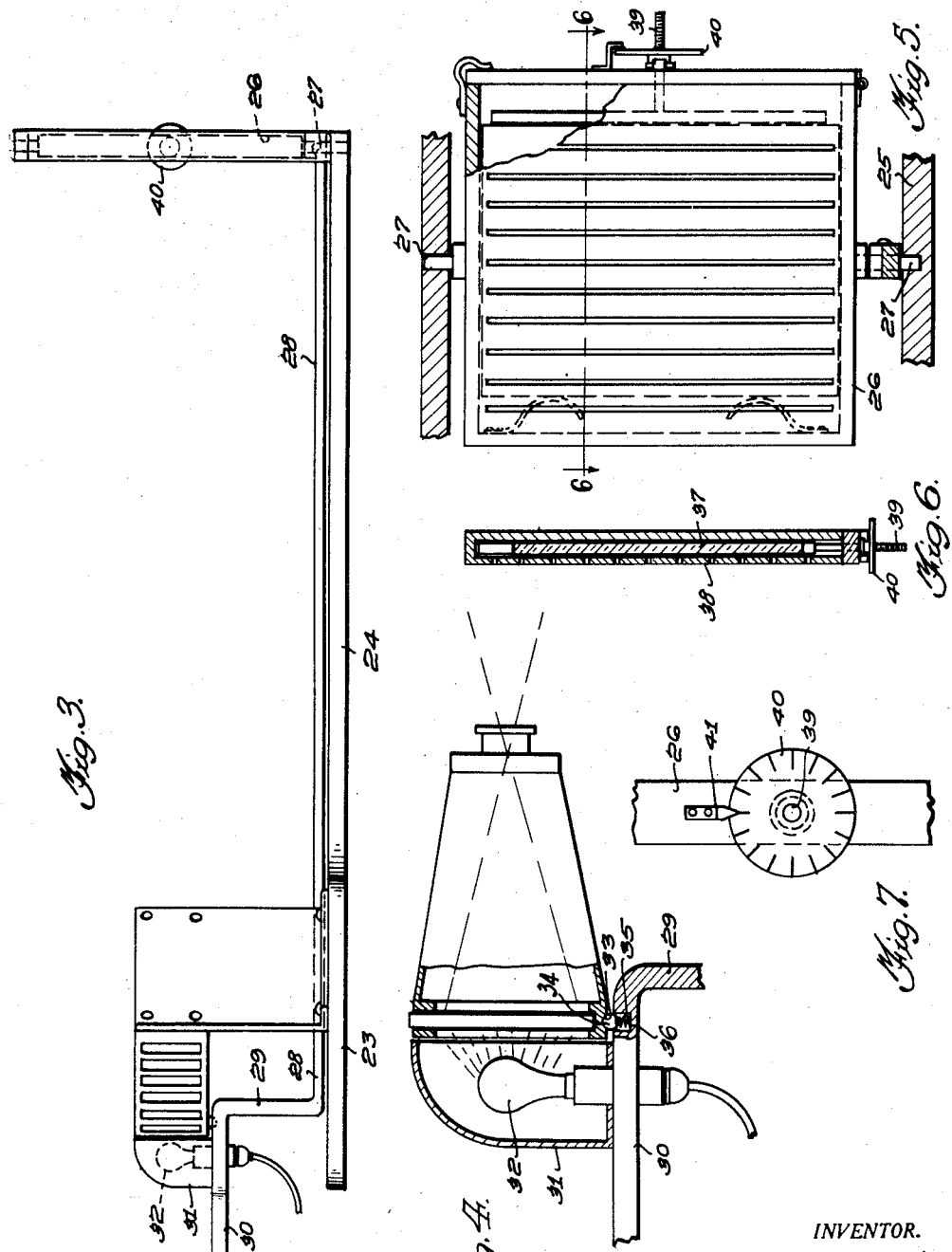
INVENTOR.
Ernest E. Draper
BY Harvey Lea Dodson
ATTORNEY.

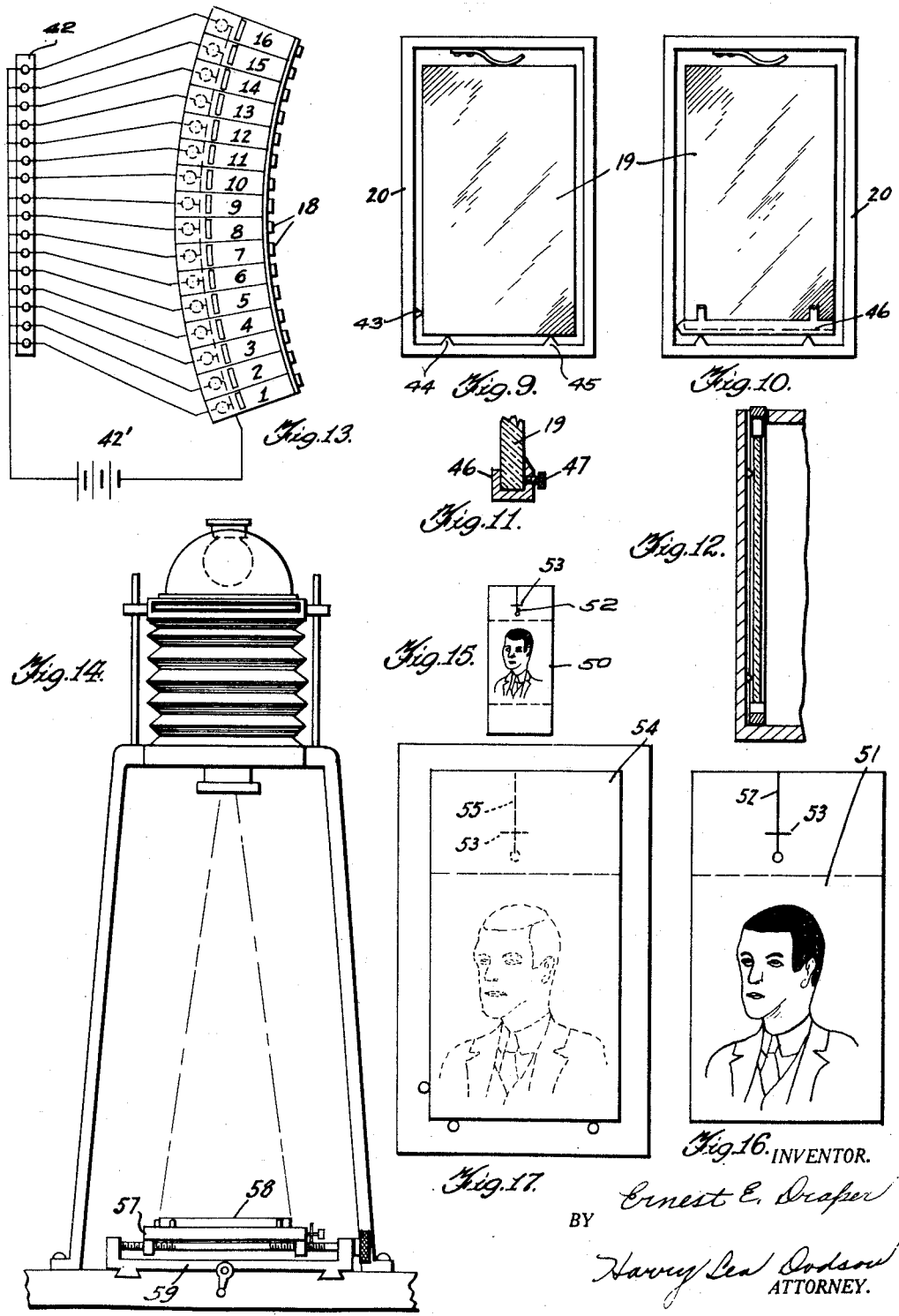

Patented Jan. 9, 1934

1,942,638

UNITED STATES PATENT OFFICE 1,942,638

PROCESS OF MAKING STEREOSCOPIC PICTURES BY INSTANTANEOUS EXPOSURE

Ernest E. Draper, Scarsdale, N. Y., assignor to The Perser Corporation, New York, N. Y., a corporation of New York Application April 24, 1931. Serial No. 532,523

8 Claims. (Cl. 88—24)

My invention relates to that class of stereoscopic pictures termed "Depthographs", a term used to define pictures taken by the Kanolt method in which a camera is swung in the arc of a circle about the object to be photographed, a screen consisting of alternate opaque and transparent lines being interposed between the plate and the object, provision being made to shift the position of the line screen in relation to the plate as the camera travels throughout the arc. The picture thus made must be viewed through a viewing line screen, in order to obtain a true stereoscopic picture. This method is highly satisfactory for still life or even when regular models are used as subjects. But it requires a number of seconds for the camera to traverse its full arc and for a person to remain still for such a long period produces a strained and unnatural expression so that suitable portraits cannot be produced. Moreover children and animals, which cannot be held still for such a period of time cannot be satisfactorily taken nor can out of door pictures be successfully taken by such a method for there is a certain amount of continuous motion going on, such as trees in the wind, etc., resulting in a blurred negative.

My invention has for its principal object to produce a method or process for making "Depthographs" under proper conditions in a fraction of a second, thereby making possible the use of the process for portraiture, for children, out of door pictures, or animals, etc., without the slightest danger of blurring or producing unnatural expression on the part of the subject. For the purposes of illustrating apparatus for carrying out my process I have furnished the accompanying drawings which are hereunto annexed and are a part of this specification in which—

Fig. 1 is a more or less diagrammatic view of a camera equipped to carry out my process;

Fig. 2 is a top or plan view of apparatus for projecting the pictures taken by the camera shown in Fig. 1 onto a sensitized plate through a line screen;

Fig. 3 is a side view of the same;

Fig. 4 is an enlarged detail view of the light box;

Fig. 5 is an enlarged view of the holder for the line screen and sensitized plate;

Fig. 6 is a section on the line 6—6 of Fig. 5;

Fig. 7 is a detail view of the adjusting disc;

Fig. 8 is a fragmentary view of the face of the camera showing the means for simultaneously diaphragming down the lenses;

Fig. 9 shows apparatus for ensuring registration of the plates;

Fig. 10 shows the application of a metal base for each plate for aiding the registration of the plates;

Fig. 11 shows a means for attaching the metal base to the plate;

Fig. 12 is a fragmentary detail view showing the plate in the camera;

Fig. 13 is a view showing means for projecting by using a battery of lights;

Fig. 14 is a view showing apparatus for making composite positives from a series of negatives by means of which it is possible to make "Depthographs" from negatives which have been retouched;

Fig. 15 is one of the original negatives;

Fig. 16 is an enlarged negative; and

Fig. 17 shows a means to obtain correct registration. Similar reference numerals refer to similar parts throughout the entire description.

As shown in the drawings my process is carried out, preferably by a camera which consists essentially of a multiplicity of cameras 1 to 16 placed in juxtaposition on the arc of a circle having a common center 17 which should be the most important object of the subject which is to be photographed. All of the cameras 1 to 16 are provided with matched lenses 18 of equal focal length. Each camera is loaded with a sensitized plate 19 mounted in a plate holder 20 as in Fig. 9. Each lens 18 of the camera is provided with a diaphragm of standard construction having a lever 21 secured to a bar 21', the reciprocation of which serves to simultaneously diaphragm down or conversely open the lenses. A shutter 22 suitably mounted on the camera is provided with apertures for admitting or excluding the light from the lenses 18 at the same time so as to have a simultaneous exposure of the plates 19 in the cameras 1 to 16 inclusive. After the plates are exposed they are then developed. These developed plates are then replaced in the cameras and projected onto a sensitized plate through a line screen. This may be done by the apparatus shown in Fig. 2 in which the camera is mounted upon a base 23 which has arms 23' and 24 which extend to a cross member 25 upon which is mounted a plate holder 26 which is carried by pivots 27, which are mounted on the center line of the arc occupied by the lenses 18 of the cameras 1 to 16. A bar 28 is secured to the plate holder and extends to the cameras. It has an upwardly extending portion 29 and a horizontal portion 30 which carries a light box 31 in which is mounted an electric light bulb 32. Each camera has a socket 33 adapted to receive a ball 34 to hold the bar light 32 in proper register with the lens. A coil spring 35 serves to hold the ball normally projected from the hole 36 formed in the horizontal portion 30 of the bar 28. From the foregoing it will be apparent that as the bar 28 is swung into position to register the light 32 with the proper lens that the plate holder 26 will swing upon its pivots 27 so that the plate 37, at all times when exposed, will be parallel to the negative. The plate holder 26 also contains a line screen and mechanism for moving the sensitized plate 37 across the line screen which consists of alternate opaque and transparent lines, the opaque ones being wide in proportion to the transparent ones. After one negative has been projected the sensitized plate 37 is moved horizontally to cover the part of the plate that has been exposed and presenting for the next exposure a new part of the plate. This process is repeated until all the negatives are reproduced in a plurality of strip images upon plate 37. Between exposures the movement of the plate must be so related to the width of the transparent vertical line and to the number of individual negatives to be used, that each resulting strip image will very nearly equal in width the combined width of one opaque and one transparent vertical line. When the plate 37 has had all of 16 negatives projected upon it, it is developed and it will be a positive similar to "Depthograph" made by the Kanolt method. I provide means for shifting the plate 37 consisting of a screw 39 which has a graduated disc 40 divided into 16 segments, a pointer 41 being mounted upon the side of the plate holder 26. This enables the operator to determine accurately when the adjusting screw 39 has been rotated sufficiently to bring the plate into the correct position for exposure.

Instead of this manner of projecting, I may employ a series of electric bulbs (shown in Fig. 13) arranged to fit on the back of the camera, one bulb being in register with the lens of each camera and so connected by suitable wiring that they can be illuminated one at a time by means of a series of switches 42. I have illustrated a battery 42' but obviously the lights can be connected to any suitable source of electric current supply (not shown). It is necessary to provide some means of ensuring correct registration when replacing the plates 19 after they have been exposed and developed and prior to their being projected onto the plate 37. One means would be as shown in Fig. 9 in which each camera 1 to 16 is equipped with a registering corner formed by points 43, 44 and 45, so arranged with relation to the lens 18 that the image of a point about which the arc is drawn passes through the same point on a ground glass when it is registered in each corner. This would insure the negatives 19 being returned to the correct positions relative to the optical system when returned to the cameras for projecting. It may be found desirable in practice to provide a metal base 46 as shown in Figs. 10 and 11 to prevent chipping of the plates 19 due to the handling. The base 46 may be secured on the plate 19 by screws 47 or in any convenient manner. I have now fully described apparatus which will enable any one to practice my new process of making stereoscopic pictures by a practical and simultaneous exposure. I shall now describe a process by which it is possible to produce satisfactory portraits which are stereoscopic. Heretofore this could not be done because when the exposure is made through a line screen the multiplicity of strip images cannot be retouched except to repair some blemish in the emulsion. By my hereinafter described process it is possible to retouch the negatives and thus turn out as artistic a portrait as can be desired. This is accomplished by the addition to the process before described of the process employing the apparatus shown in Figs. 14 to 16 inclusive. After the negative 50 is produced in cameras 1 to 16 as already set forth, it is enlarged to any desired size as 51 in Fig. 16 in which condition it can be retouched by the artist as fully as desired since neither the negative 50 nor 51 were taken with a line screen. At the time of making the exposure, a plumb line shown at 52 is suspended above the object's head and over the center 17 of the arc but high enough not to be included in the space to be used in the finished picture, low enough however to appear on the end of each negative. The plumb line 52 should have a cross bar which will also be shown on each negative. As this plumb 52 is located at the center 17 of the arc all the images of it on the composite should coincide and therefore it is a means for locating each negative in relation to the plate holder before each individual exposure of the composite is made.

First, number one negative is placed in the enlarging outfit with no attempt at registration of any kind. A piece of white material 54 is placed in the focal plane and will later be occupied by the sensitized emulsion of the plate 58 in a plateholder 57 mounted upon a movable bed 59.

This white card 54 is larger than the plateholder so the image of the plumb line 52 may be seen as well as the subject matter to be printed. It is shifted around until the part of the image to be used is placed where it should be on the section representing the plateholder 57.

Then, carefully, a pencil line 55 is drawn on the card 54 over the image of the plumb line 52, taking care also to mark the point of crossing of the cross arm 53. The card 54, which has been registered in the corner of a movable bed 59 is replaced by a plateholder 57 and exposure number one made. Negative number one is replaced by number two and the plate 58 moved the required amount in the plateholder 57. Then the plateholder 57 is replaced by the registering card 54 and the movable bed 59 and card 54 are moved around as a unit under the image until the pencil marking 55 of the plumb line 52 and cross arm 53 coincide with their photographic image.

Then the plateholder 57 is put on the movable bed 59 in place of the card 54 and the second exposure made. This process continues until all the negatives have been printed and the sensitized positive plate 58 has been moved one complete line or as near that as desired.

This process allows the use of any enlarging apparatus and any lens. Pleasing diffusion may be used to eliminate objectionable details either by means of diffusion lens or disc, ground glass, silk, or other material. Greater speed in making the composite results from the use of a larger lens than any in the optical system in the camera.

It also eliminates the necessity of close registration of the plates in the plateholder, in taking the original negatives and the necessity of returning the negatives to exactly the same positions in the camera for combining.

Thus it will be seen that another advantage of the new method is that retouching can be accomplished by working on each individual negative before the composite picture is made.

If the size of the individual negatives is too small for good retouching, enlarged positives or negatives or both may be made and retouched.

By means of proper registration these may be reduced again to original size to be projected through the original optical system onto the composite plate or by using the method of combining that utilizes the ordinary enlarging or projection printer the intermediate negatives or positives may be combined directly as no registration is necessary except visual overlaying of the plumb line images in projecting.

While I have used certain terms and described specific apparatus I wish it to be distinctly understood that the terminology is solely for description and not limitation and the details are to set forth apparatus by which my processes may be carried out and not at all with the intention of limiting myself to such details of construction.

Having described my invention what I regard as new and desire to secure by Letters Patent is:

1. The process of making stereoscopic pictures comprising arranging a multiplicity of cameras having matched lenses of the same focal length in an arc of a circle about the object to be photographed, simultaneously exposing a sensitized plate in each camera, developing said negatives, then projecting them consecutively onto a sensitized plate through a line screen moving the line screen for the exposure of each plate, maintaining the said plate parallel to each negative during the projection.

2. The process of making stereoscopic pictures comprising arranging a multiplicity of cameras having matched lenses of the same focal length in an arc of a circle about the object to be photographed, simultaneously exposing a sensitized plate in each camera, developing said negatives, returning each plate to the camera in which it was exposed, projecting the negatives successively by a light source back of each camera onto a sensitized plate located behind a line screen, moving the line screen for the exposure of each plate, maintaining the said plate parallel to each negative during the projection.

3. The process of making stereoscopic pictures comprising arranging a multiplicity of cameras having matched lenses of the same focal length in an arc of a circle about the object to be photographed, simultaneously exposing a sensitized plate in each camera, developing said negatives, arranging a light source behind said cameras, moving said light and a sensitized plate together to maintain both plates parallel projecting said negatives onto said sensitized plate through a line screen, moving the line screen for the exposure of each plate, maintaining the said plate parallel to each negative during the projection.

4. The process of making stereoscopic pictures which can be retouched comprising arranging a multiplicity of cameras, having matched lenses of the same focal length, in the arc of a circle about the object to be photographed simultaneously exposing a series of plates in said cameras developing the negatives, then retouching them projecting said negatives through a line screen onto a sensitized plate on a movable bed providing means to ensure correct registration of said negatives with said plate.

5. The process of making stereoscopic pictures which can be retouched comprising arranging a multiplicity of cameras, having matched lenses of the same focal length, in the arc of a circle about the object to be photographed simultaneously exposing a series of plates in said cameras developing the negatives, then retouching them making enlargements of said negatives, retouching said enlargement, projecting said enlargement through a line screen onto a sensitized plate on a movable bed providing means to ensure correct registration of said negatives with said plate.

6. The process of making stereoscopic pictures comprising arranging a multiplicity of cameras in an arc of a circle about the object to be photographed, simultaneously exposing a sensitized plate in each camera, developing said negatives, then projecting them consecutively onto a sensitized plate through a line screen moving the line screen for the exposure of each plate, maintaining the said plate parallel to each negative during the projection.

7. The process of making stereoscopic pictures which can be retouched comprising arranging a multiplicity of cameras in the arc of a circle about the object to be photographed simultaneously exposing a series of plates in said cameras developing the negatives, then retouching them projecting said negatives through a line screen onto a sensitized plate on a movable bed providing means to ensure correct registration of said negatives with said plate.

8. The process of making stereoscopic pictures comprising arranging a multiplicity of cameras having matched lenses of the same focal length in an arc of a circle about the object to be photographed, simultaneously exposing a sensitized plate in each camera, developing said negatives, then projecting them consecutively onto a sensitized plate mounted at the center of said arc through a line screen moving the line screen for the exposure of each plate, maintaining the said plate parallel to each negative during the projection.

ERNEST E. DRAPER.